United States Patent [19]
Salisbury, Jr.

[11] Patent Number: 5,730,499
[45] Date of Patent: Mar. 24, 1998

[54] ADJUSTABLE GUIDE ASSEMBLY FOR A VEHICLE SEAT BELT SYSTEM

[75] Inventor: Roy S. Salisbury, Jr., Rochester, Mich.

[73] Assignee: Ford Global Technologies, Inc., Dearborn, Mich.

[21] Appl. No.: 536,591

[22] Filed: Sep. 29, 1995

[51] Int. Cl.⁶ .................................................. B60R 22/26
[52] U.S. Cl. .......................... 297/473; 297/483; 280/808
[58] Field of Search ............................. 297/473, 464, 297/468, 469, 483, 482, 452.18; 280/808

[56] References Cited

U.S. PATENT DOCUMENTS

| | | | |
|---|---|---|---|
| Re. 32,524 | 10/1987 | Temple | 297/483 X |
| 3,080,634 | 3/1963 | Lindblad. | |
| 4,579,368 | 4/1986 | Kawada et al. | 297/483 X |
| 4,611,825 | 9/1986 | Patterson | 297/483 X |
| 4,640,550 | 2/1987 | Hakansson | 297/483 |
| 4,643,449 | 2/1987 | Sasaki et al. | 280/808 |
| 4,720,147 | 1/1988 | Takada | 297/483 X |
| 4,832,366 | 5/1989 | Corbett et al. | 280/808 |
| 4,907,821 | 3/1990 | Föhl | 297/483 X |
| 4,940,254 | 7/1990 | Ueno | 297/483 X |
| 4,941,682 | 7/1990 | Yamamoto | 297/483 X |
| 4,984,822 | 1/1991 | Shimizu et al. | 297/483 X |
| 5,016,916 | 5/1991 | Yokote et al. | 297/483 X |
| 5,037,135 | 8/1991 | Kotikovsky et al. | |
| 5,263,741 | 11/1993 | Seros | 297/483 X |
| 5,286,057 | 2/1994 | Forster | 297/483 X |
| 5,393,098 | 2/1995 | Thomas et al. | 297/483 X |
| 5,609,396 | 3/1997 | Loxton | 297/473 |
| 5,658,051 | 8/1997 | Vega et al. | 297/483 |
| 5,660,444 | 8/1997 | Thomas | 297/483 X |

FOREIGN PATENT DOCUMENTS

| | | |
|---|---|---|
| 0 374 893 | 6/1990 | European Pat. Off. . |
| 26 55 995 | 6/1978 | Germany. |
| 1-229744 | 9/1989 | Japan. |
| 5-112204 | 5/1993 | Japan. |

*Primary Examiner*—Jose V. Chen
*Assistant Examiner*—Rodney B. White
*Attorney, Agent, or Firm*—Daniel M. Stock; Lynn M. DaDamio

[57] ABSTRACT

A seat belt system for a vehicle seat is provided. In one embodiment, the seat belt system includes a shoulder strap, a retractor for tensioning the shoulder strap at one end thereof, a seat belt buckle for securing the shoulder strap at the opposite end thereof, and an adjustable guide assembly for directing the shoulder strap across an occupant of the seat. The guide assembly includes a guide body having a webbing opening through which the shoulder strap extends and a push-button mechanism capable of positioning the guide body in any one of a plurality of rotational positions relative to the seat.

11 Claims, 2 Drawing Sheets

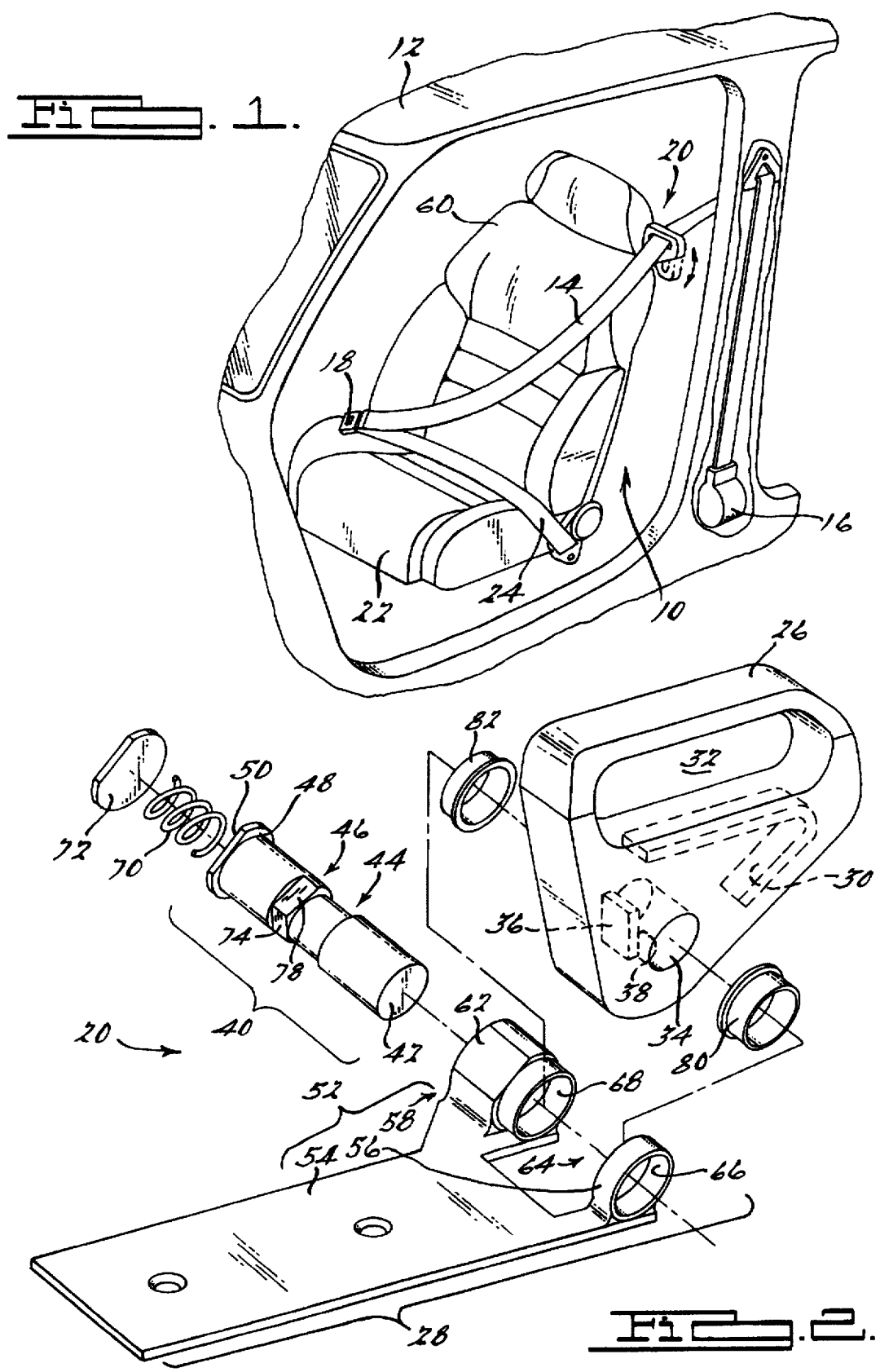

ADJUSTABLE GUIDE ASSEMBLY FOR A VEHICLE SEAT BELT SYSTEM

BACKGROUND OF THE INVENTION

1. Field of the Invention

The present invention relates to a vehicle seat belt system having an adjustable guide assembly capable of angularly adjusting the path of a shoulder belt strap for the comfort of vehicle occupants.

2. Description of Related Art

Vehicle seat belt systems which include guides for directing shoulder straps diagonally across the torsos of vehicle occupants are well known. A problem with many such systems is that the guides are located in fixed positions relative to the vehicle seats. A shoulder strap passing through one of these guides is positioned along a fixed path relative to the seat. In this position, the strap may be comfortable for some vehicle occupants but uncomfortable for others due to differences in the sizes of the occupants.

This problem is addressed in U.S. Pat. No. 5,263,741, by providing a seat-mounted, laterally adjustable shoulder belt guide. While this design represents an improvement over fixed guides, the adjustability of the guide is still rather limited. It would be desirable to provide an adjustable guide that is not restricted to lateral movement.

SUMMARY OF THE INVENTION

The present invention provides a seat belt system for a vehicle seat having an adjustable guide assembly which overcomes the disadvantages of the prior art. The seat belt system of the present invention includes a shoulder strap, means for tensioning the shoulder strap at one end thereof, means for securing the shoulder strap at the opposite end thereof, and an adjustable guide assembly for directing the shoulder strap across an occupant of the seat. The guide assembly includes a guide body having a webbing opening through which the shoulder strap extends and means for positioning the guide body in any one of a plurality of rotational positions relative to the seat.

The present invention solves the problems associated with the prior art by providing a seat belt system having a guide assembly that is capable of both lateral and height adjustment.

BRIEF DESCRIPTION OF THE DRAWINGS

FIG. 1 is a perspective view of a seat belt system having a shoulder belt guide assembly with an adjustable guide body according to the present invention.

FIG. 2 is an exploded perspective view of the guide assembly of FIG. 1.

DETAILED DESCRIPTION OF PREFERRED EMBODIMENTS

Figure 3:
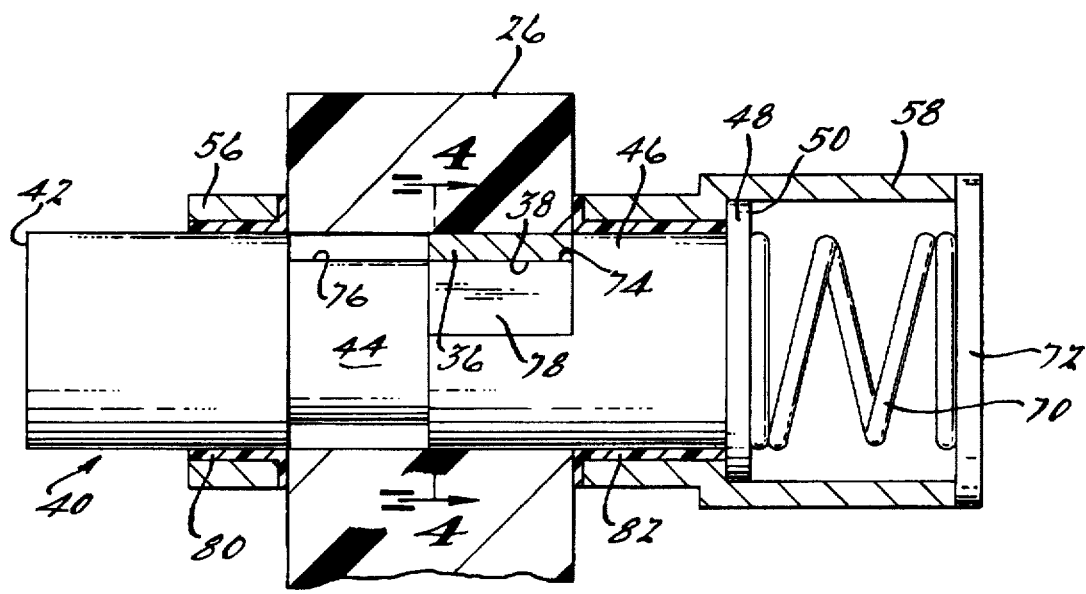
FIG. 3 is a cross-sectional view of the guide assembly of FIG. 1.

FIG. 1 shows a seat belt system 10 mounted in an automotive vehicle 12. Seat belt system 10 includes a shoulder strap 14, means 16 for tensioning shoulder strap 14 at one end thereof (e.g., a retractor), means 18 for securing shoulder strap 14 at the opposite end thereof (e.g., a conventional seat belt buckle), and a guide assembly 20 which adjustably directs the path of shoulder strap 14 across the body of an occupant of seat 22. Seat belt system 10 also includes a lap belt 24.

As illustrated in FIGS. 2-3, guide assembly 20 includes a guide body 26 and means 28 for positioning guide body 26 in any one of a plurality of rotational positions relative to seat 22. Guide body 26 is preferably made of a tough, wear resistant plastic material and may be provided with a metal reinforcing insert 30. In the embodiment shown, guide body 26 has an oblong webbing opening 32 for receiving shoulder strap 14 therethrough and a generally cylindrical bore 34. Bore 34 has a stop member 36 positioned therein. In one embodiment of the invention, stop member 36 is simply an extension of metal reinforcing insert 30. Alternatively, as shown, stop member 36 may be a separate insert provided in guide body 26. Flat surface 38 of stop member 36 extends across at least a portion of bore 34.

As indicated above, means 28 for positioning guide body 26 allows an occupant of seat 22 to rotate guide body 26 relative to seat 22 and thereby adjust the path of shoulder strap 14 to minimize any discomfort caused by the strap. In the illustrated embodiment, means 28 for positioning guide body 26 is a push-button mechanism which includes a pin member 40 having a front portion 42, a release portion 44, a locking portion 46, an anti-rotation portion 48, and a back portion 50. The push-button mechanism further includes means 52 for mounting pin member 40 to seat 22. While any suitable mounting means may be used, in the illustrated embodiment, means 52 comprises an elongated member 54 having two coaxial bosses 56, 58 positioned at one end thereof and spaced apart a predetermined distance. Elongated member 54 is mounted to the top portion of seat back 60 of seat 22 in conventional fashion, as for example with threaded fasteners. Bosses 56, 58 receive pin member 40 such that axial movement of pin member 40 is permitted while rotational movement of pin member 40 is restricted. Rotational movement of pin member 40 may be prevented by any suitable means. For example, in the illustrated embodiment, pin member 40 is provided with a D-shaped anti-rotation portion 48 which engages a corresponding D-shaped portion 62 of coaxial boss 58.

Guide assembly 20 may be constructed by positioning guide body 26 in the space 64 between bosses 56, 58, such that bore 34 in guide body 26 is axially aligned with openings 66, 68 in bosses 56, 58. Pin member 40 may then be inserted into bore 34 and each of the aligned openings 66, 68. As previously stated, pin member 40 will be positioned such that its D-shaped, anti-rotation portion 48 is aligned with D-shaped portion 62 of boss 58. In addition, pin member 40 will be positioned such that its front portion 42 is exposed to the occupant of seat 22. As described more fully below, the occupant need only press on front portion 42 of pin member 40 to initiate rotational movement of guide body 26 about pin member 40. A biasing means, such as compression spring 70, is provided between back portion 50 of pin member 40 and an end cap 72 covering opening 68 of boss 58. Spring 70 functions to return pin member 40 to a locked position when the occupant ceases to press on front portion 42. End cap 72 may be attached to boss 58 in any conventional fashion, e.g., by being welded, staked or threaded thereon.

Turning now to FIGS. 3-6, the operation of guide assembly 20 will be described in greater detail. For illustration purposes, guide body 26 is depicted as being adjustable between only two rotational positions. Of course, those skilled in the art will understand that, in practice, guide 26 may be positioned in any one of a plurality of rotational positions relative to pin member 40 and seat 22.

Figure 4:
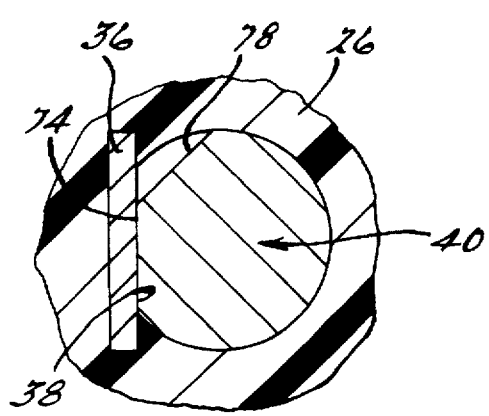
FIG. 4 is a sectional view of FIG. 3 taken along line 4—4, showing the guide body in a first locked position on a pin member.

Beginning with FIGS. 3 and 4, guide body 26 is shown in a first locked position on pin member 40. In this position, flat surface 38 of stop member 36 engages a first flat locking surface 74 on locking portion 46 of pin member 40. Rotational movement of guide body 26 relative to pin member 40 is thereby impeded.

Figure 5:
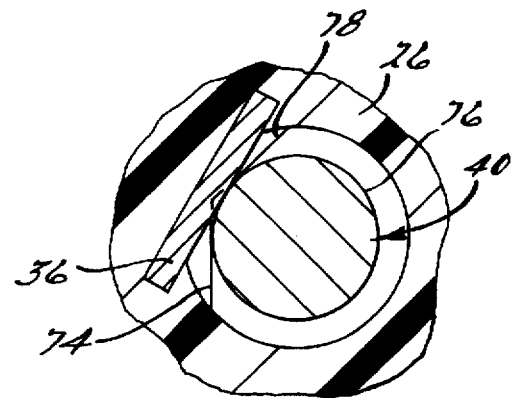
FIG. 5 is a sectional view of FIG. 3 taken along line 4—4, showing the guide body being rotated about a release portion of the pin member.

Upon depressing pin member 40, spring 70 compresses and allows release portion 44 of pin member 40 to slide into alignment with stop member 36 (see FIG. 5). Stop member 36 and guide body 26 are freely rotatable about the arcuate surface 76 of release portion 44.

Figure 6:
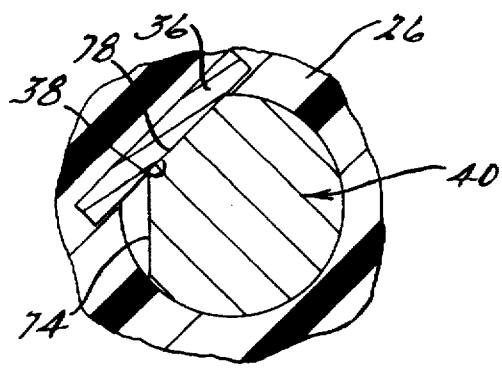
FIG. 6 is a sectional view of FIG. 3 taken along line 4—4, showing the guide body in a second locked position on the pin member.

In moving between the first locked position shown in FIG. 4 and the second locked position shown in FIG. 6, guide body 26 is rotated angularly downwardly relative to seat back 60. Then, upon releasing pin member 40, spring 70 causes second flat locking surface 78 to slide into engagement with stop member 36.

To permit stop member 36 to smoothly engage and disengage from release portion 44 and locking surfaces 74, 78, arcuate surface 76 of release portion 44 is preferably tangential to flat locking surfaces 74, 78, as illustrated in FIG. 5. The axial sliding movement of pin member 40 may also be facilitated by providing coaxial bosses 56, 58 with plastic liners or bushings 80, 82 (see FIG. 2). Pin member 40 is also preferably provided with highly polished surfaces to permit easy movement of pin member 40 relative to guide body 26.

While the invention has been shown and described in its preferred embodiments, it will be clear to those skilled in the arts to which it pertains that many changes and modifications may be made thereto without departing from the scope of the invention. For example, while locking portion 46 and stop member 36 have been illustrated as having flat mating surfaces 74, 78, and 38, the circumference of locking portion 46 could alternatively be provided with a plurality of locking teeth for engaging corresponding indentations in bore 34.

What is claimed is:

1. A seat belt system for a vehicle seat including a shoulder strap, means for tensioning said shoulder strap at one opposite end thereof, means for securing said shoulder strap at the opposite end thereof, and an adjustable guide assembly for directing said shoulder strap across an occupant of said seat, said guide assembly comprising:

a guide body having a webbing opening through which said shoulder strap extends; and means for positioning said guide body in any one of a plurality of rotational positions relative to said seat.

2. A seat belt system according to claim 1, wherein said means for positioning said guide body comprises a push-button mechanism, said push-button mechanism comprising a pin member and mounting means for mounting said pin member to said vehicle seat.

3. A seat belt system according to claim 2, wherein said mounting means comprises a pair of coaxial, spaced apart bosses, each of said bosses having a pin opening therethrough for receiving said pin member.

4. A seat belt system according to claim 3, wherein said bosses are spaced apart a predetermined distance for receiving said guide body therebetween.

5. A seat belt system according to claim 3, wherein one of said bosses is provided with means for restricting rotational movement of said pin member.

6. A seat belt system according to claim 2, wherein said guide body further includes a bore for receiving said pin member therein.

7. A seat belt system according to claim 6, wherein said bore has a stop member disposed therein.

8. A seat belt system according to claim 7, wherein said pin ember is configured to releasably engage said stop member.

9. A seat belt system according to claim 8, wherein said pin member has a release portion and a locking portion, and said push-button mechanism further includes biasing means cooperating with said pin member such that upon axial movement of said pin member against said biasing means, said guide body is operative to rotate about said release portion of said pin member.

10. A seat belt system according to claim 9, wherein said locking portion of said pin member has a locking surface configured to engage said stop member of said guide body, such that when said locking surface engages said stop member, rotational movement of said guide body relative to said pin member is impeded.

11. A seat belt system according to claim 10, wherein said locking portion includes a plurality of locking surfaces.

* * * * *